(12) United States Patent
Sanwald et al.

(10) Patent No.: US 6,276,729 B1
(45) Date of Patent: Aug. 21, 2001

(54) CONNECTION ELEMENT FOR CONNECTING NEIGHBORING CONNECTION SECTIONS ON TUBES AND/OR CONTAINER OPENINGS, IN PARTICULAR ON LABORATORY APPARATUS

(75) Inventors: Marco Sanwald; Richard Widmer, both of Gossau (CH)

(73) Assignee: Buchi Labortechnik AG, Flawil (CH)

(*) Notice: Subject to any disclaimer, the term of this patent is extended or adjusted under 35 U.S.C. 154(b) by 0 days.

(21) Appl. No.: 09/253,139

(22) Filed: Feb. 19, 1999

(30) Foreign Application Priority Data

Jun. 3, 1998 (EP) .................................................. 98810192

(51) Int. Cl.[7] ..................................................... F16L 23/00
(52) U.S. Cl. ............................ 285/415; 285/368; 285/420
(58) Field of Search ..................................... 285/415, 368, 285/420, 363

(56) References Cited

U.S. PATENT DOCUMENTS

| 3,642,307 | * | 2/1972 | Brickhouse et al. | 285/420 X |
|---|---|---|---|---|
| 3,895,833 | * | 7/1975 | Thiessen | 285/368 X |
| 3,910,610 | | 10/1975 | Turner et al. | 285/337 |
| 4,381,020 | | 4/1983 | Daghe et al. | 138/99 |
| 4,620,732 | * | 11/1986 | Marshall | 285/368 |
| 5,018,768 | * | 5/1991 | Palatchy | 285/420 X |
| 5,314,215 | * | 5/1994 | Weinhold | 285/368 X |
| 5,653,481 | * | 8/1997 | Alderman | 285/363 |
| 5,692,544 | * | 12/1997 | Friedrich et al. | 285/420 X |
| 5,779,282 | * | 7/1998 | Ezze | 285/368 X |
| 5,829,794 | * | 11/1998 | Schulz-Hausmann et al. | 285/368 X |
| 5,873,611 | * | 2/1999 | Munley et al. | 285/420 X |
| 6,056,330 | * | 5/2000 | Compton et al. | 285/368 X |
| 6,056,332 | * | 5/2000 | Foster | 285/420 X |

FOREIGN PATENT DOCUMENTS

| 614 905 | 12/1979 | (CH) . |
|---|---|---|
| 1 600 403 | 1/1970 | (DE) . |
| 26 55 959 | 6/1978 | (DE) . |
| 0 180 656 | 11/1984 | (EP) . |
| 2 232 728 | 10/1973 | (FR) . |

\* cited by examiner

Primary Examiner—Suzanne Dino Barrett
(74) Attorney, Agent, or Firm—Shoemaker and Mattare, Ltd

(57) ABSTRACT

The connection element (1) is preferably provided with two retaining collars (5, 5') which enclose the connection sections (2, 2') which do the holding together. The retaining collars are releasably connected to one another or held against one another by way of fastening elements, preferably screw bolts (6). Each retaining collar consists of at least two segments (9a, 9b). With this the fastening elements have additionally also still the function of holding together the two segments. For releasing the connection at least one of the segments can be pivoted open.

11 Claims, 8 Drawing Sheets

Figure 1:
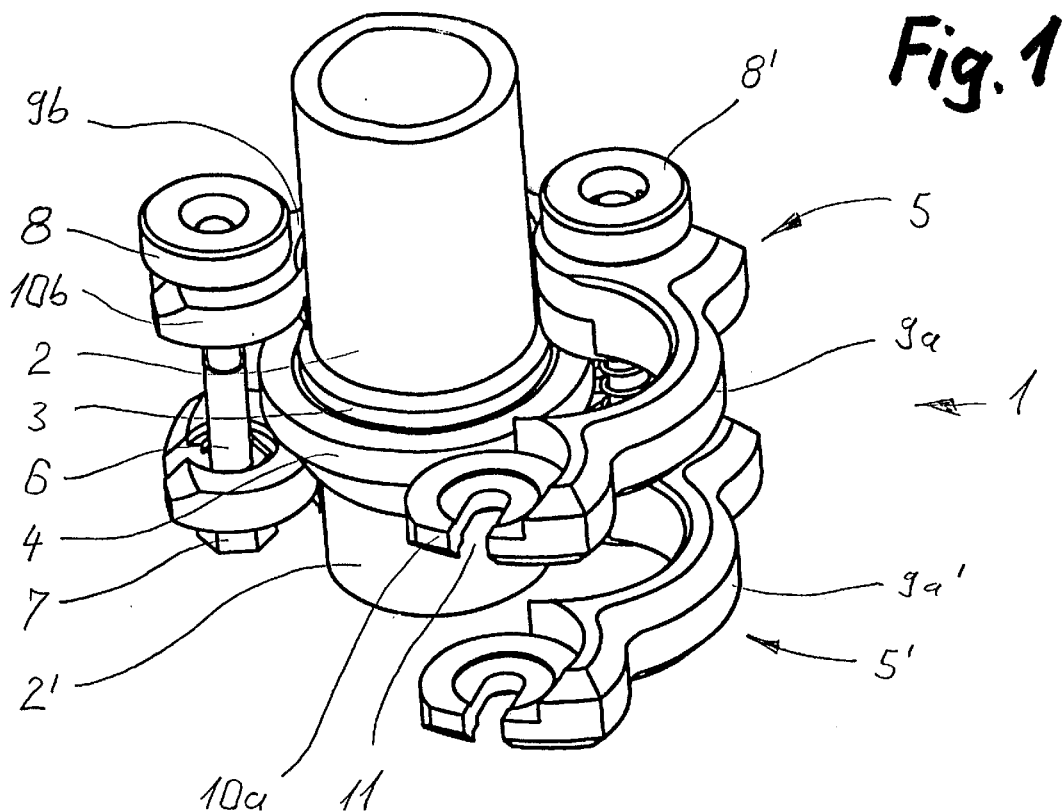

CONNECTION ELEMENT FOR CONNECTING NEIGHBORING CONNECTION SECTIONS ON TUBES AND/OR CONTAINER OPENINGS, IN PARTICULAR ON LABORATORY APPARATUS

The invention relates to a connection element for connecting neighbouring connection sections on tubes and/or container openings, in particular on laboratory apparatus, according to the preamble of claim 1. These connection elements must hold together the connection sections in a substantially fluid-tight and/or gas-tight manner, wherein in particular in experimental arrangements with respect to laboratory technology there is required a quick releasability. The connection sections have in many cases a spherical ground joint so that an axial deviation in all directions is possible to a limited extent. The connection elements are therefore also called a flex connection.

Known connection elements are as a rule formed as a conventional flange connection with loose flanges, whose attachment is however difficult, according to the nature of the connection section. With the connection elements it is the case of screwings which however for separating the two connection sections must be completely released. This is time consuming and may only be carried out with both hands so that an operating person no longer has a free hand for holding firmly for example a glass flask to be released.

From U.S. Pat. No. 3,910,610 for sealing a leakage on tube connections it is known to apply two retaining collars each consisting of two segments separable from one another. The segments which are separable from one another are formed identically and comprise end sections engaging into one another. A simple release of the connection with such a design is not possible on account of the engagement.

It is therefore the object of the invention to provide a connection element of the previously mentioned type which is to be inexpensively manufactured and which can be operated simply and where possible with one hand, without the security of the connection being compromised. This object according to the invention is achieved by a connection element which comprises the features in claim 1. The fastening elements connect simultaneously the separable segments and the retaining collars in a manner such that by releasing a single fastening element one of the retaining collars may be opened so far that the connection sections may be separated from one another.

Advantageously neighbouring segments comprise mutually overlapping end sections which are each provided with an opening for joining the fastening elements, wherein the openings of end sections which overlap run congruently in the closed condition. With this a relatively slim construction without protruding parts is achieved and the closed segments form as a whole a compact unit.

The fastening elements are preferably screw bolts which penetrate the retaining collars and which are at least provided with a screw nut. Alternative fastening elements would however be conceivable, such as tension springs, clips or likewise.

If on at least one screw bolt a helical compression spring is mounted between the retaining collars, the two retaining collars are tensioned apart so that with the release procedure they do not fall together. This simplifies the joining or removal to and from the connection sections.

Additionally between the screw head or the screw nut of a screw bolt and a retaining collar there may be mounted a further helical compression spring. The tightening of the screwing with this is effected against spring force, by which means amongst other things also excess pressure forces are prevented. For achieving such a buffer effect instead of a helical compression spring however also other spring elements such as e.g. spring disks or likewise could also be applied. It would also be conceivable to integrate such elements directly into the screw head or into the screw bolt.

A particularly simple handling of the connection element may be achieved in that the openings in the overlapping end sections are formed radially towards the outside in a continuous manner and in that the screw bolts can be laterally guided out. The nuts thus remain constantly on the screw bolts and only need to be released so far that the screw bolt may be laterally guided out from the U-shaped bolt. The axial withdrawal of the screw bolt which is mostly difficult generally for reasons of space, is thus no longer required.

Further advantages may be achieved when the overlapping end sections engage into one another in a jointed manner, in a way such that after the guiding out of the oppositely lying screw bolt they may be pivoted open about the axis of the remaining screw bolt. With this the remaining screw bolt practically forms a joint axis, wherein the joint function is supported by the particular shape of the end sections as a joint head or joint socket. A complete disassembly of the retaining collar is practically only required for cleaning purposes. For introducing and guiding out a connection section the one-sided opening and pivoting open of the segments is sufficient.

If the overlapping end sections in the region of the opening on the outer side and/or on the inner side are provided with a pocket hole, therein on the outer side there may be supported a screw head and a screw nut and on the inner side for example a helical compression spring. The pocket hole has at the same time a larger diameter than the width of the opening leading to the outside, which as a rule correponds to the width of the screw bolt. By way of this with a tightened screwing, as a result of the supporting in the pocket hole it is prevented that the screw bolt is laterally pulled out. For reasons of manufacturing technology it is particularly useful when the end sections of an individual segment are formed symmetrically in opposite directions in a manner such that identical but laterally reversely connected sections fit together with a positive fit. A retaining collar is thus composed of completely identical segments, which merely must be turned around in order to fit together with a positive fit.

With larger diameters on the connection sections it may be useful if the retaining collar comprises three preferably identically formed segments which are held together by three fastening elements. With this it is prevented that the segments need be excessively heavily pivoted in order to permit a moving out of the connection segments. Also with three segments it is however sufficient when only a single fastening element is removed in order to pivot open the segments at one location.

In the normal case the connection element comprises two identically formed retaining collars. According to the configuration of the connection sections to be connected, the retaining collars may however also have differing shapes. The segments of the retaining collars may be manufactured of plastic material, metal or in certain cases also of ceramic materials.

In certain cases of application it is conceivable that the connection element only comprises one retaining collar with separable segments and that the counter-bearing for the fastening elements is a rigid counter-bearing element. Such a counter-bearing element could for example be arranged loosely or rigidly on a laboratory apparatus to which there is connected a tube connection piece.

Figure 2:
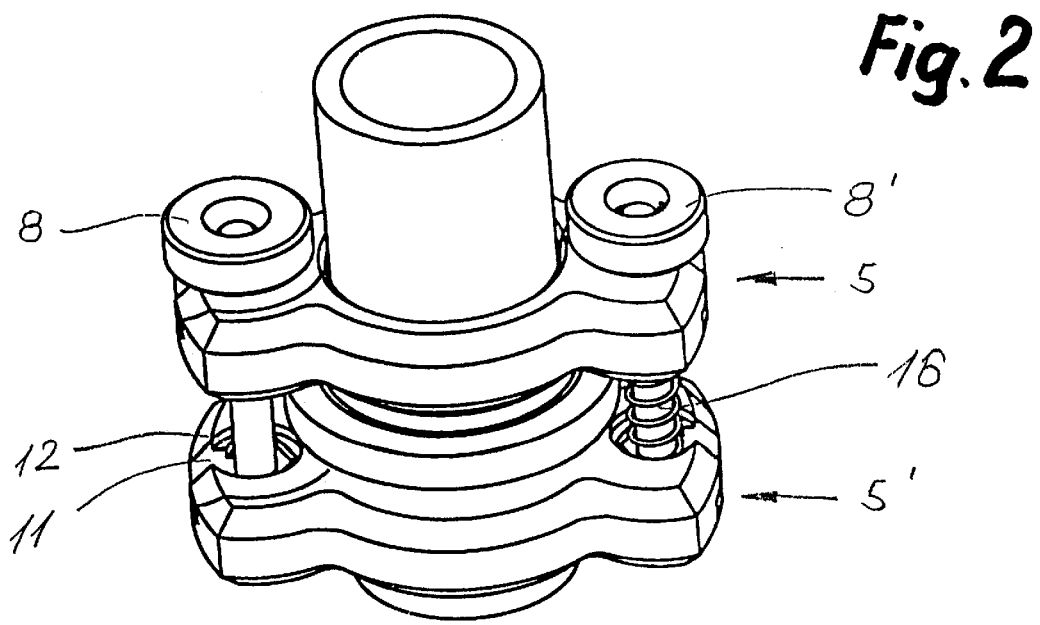
Figure 3:
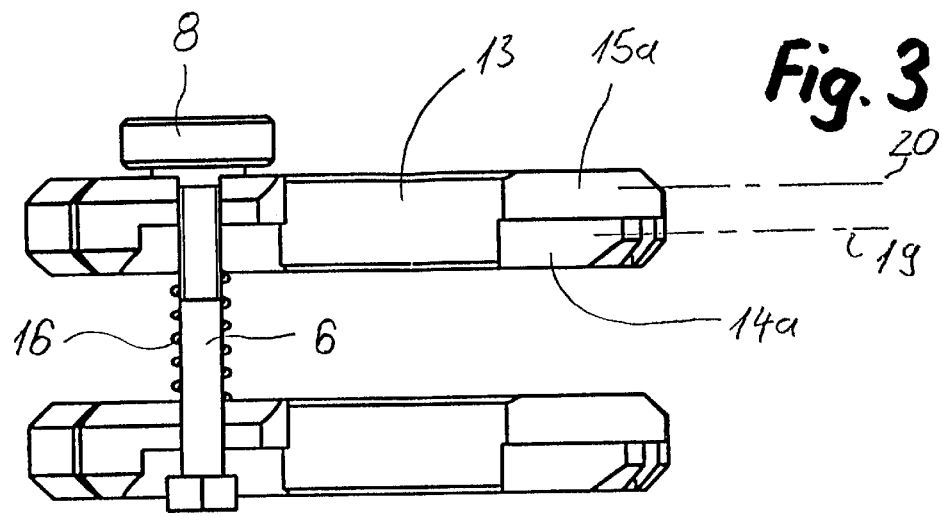
Figure 4:
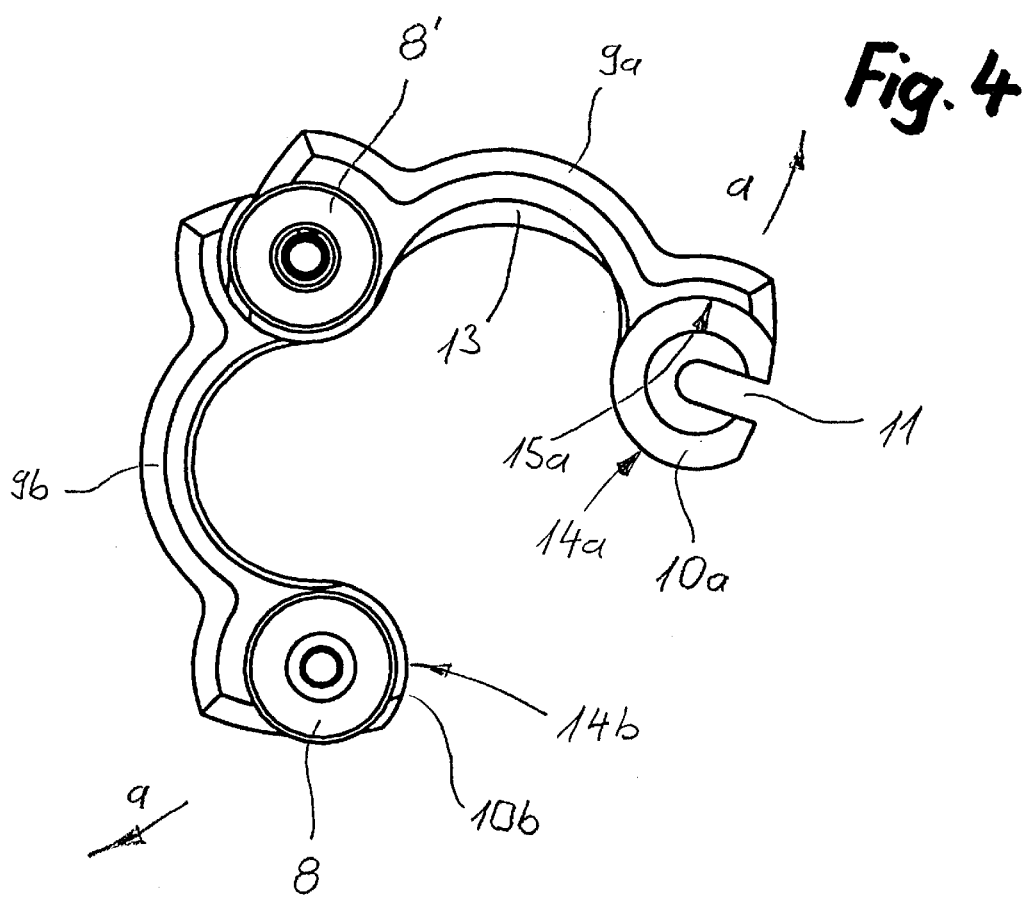
Figure 5:
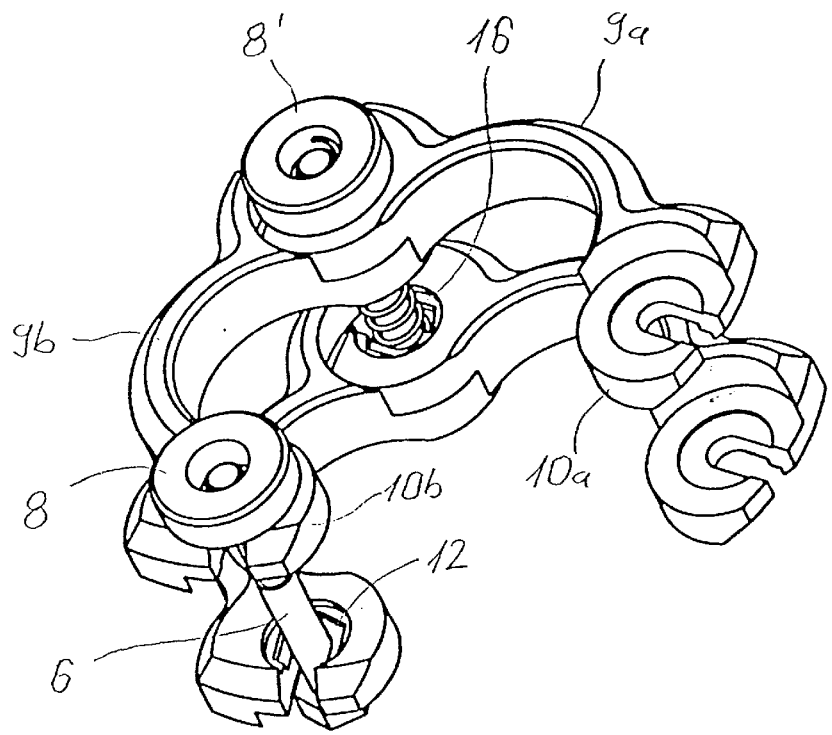
Figure 6:
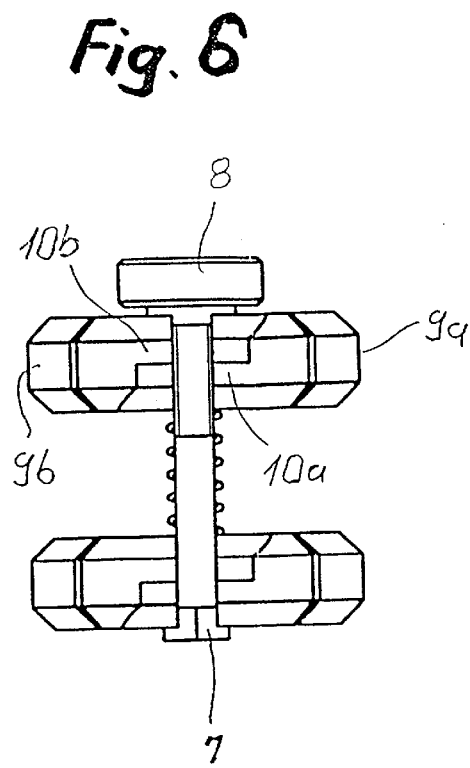
Figure 7:
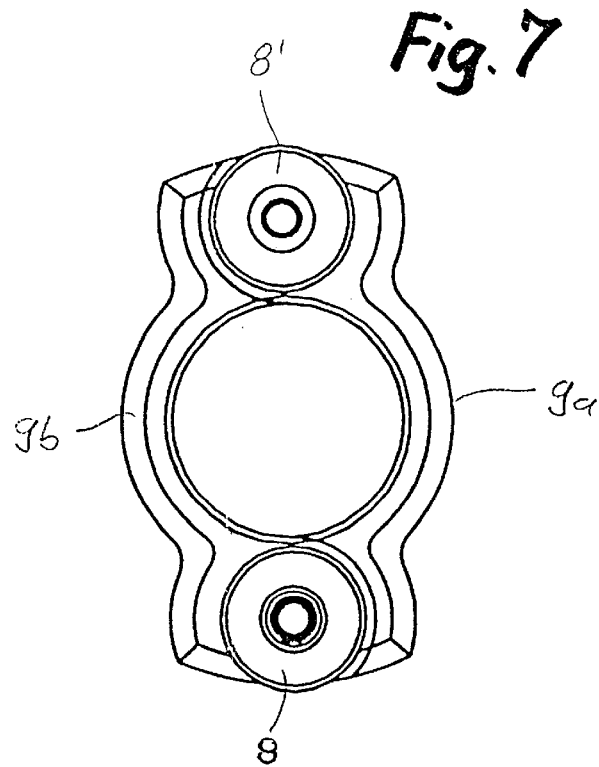
Figure 8:
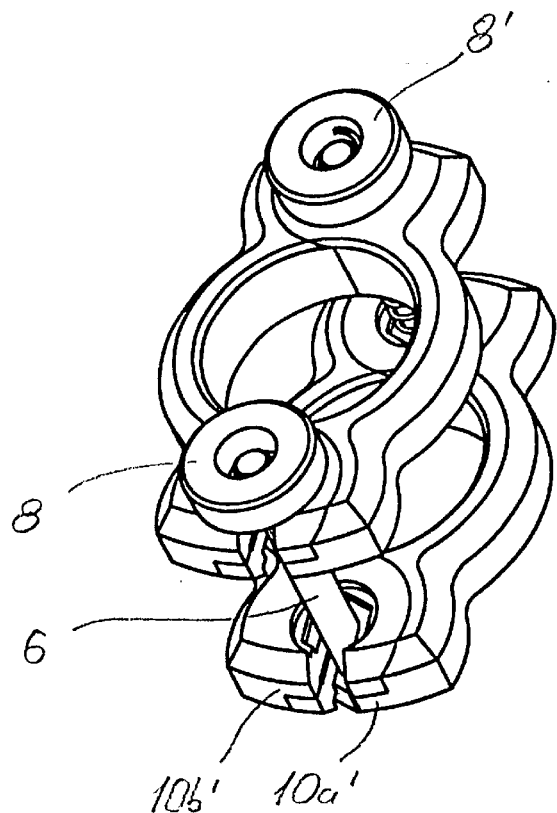
Figure 9:
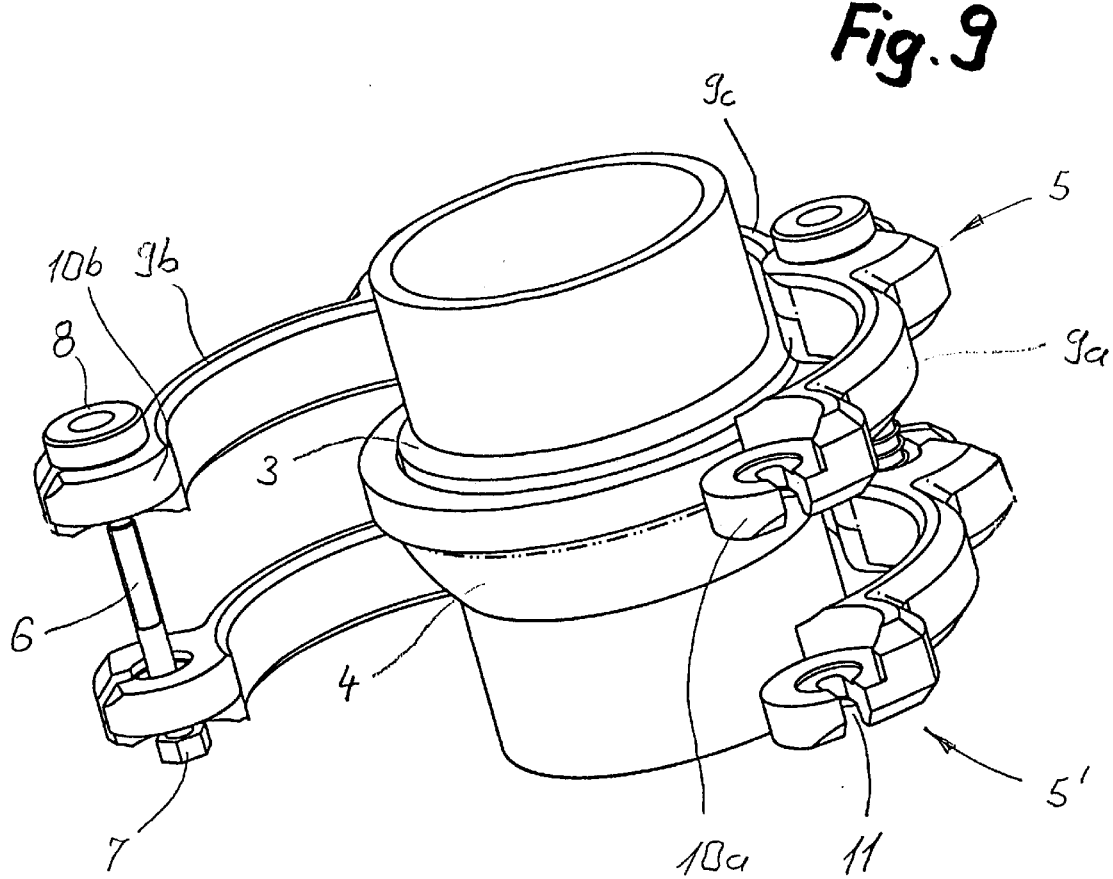
Figure 10:
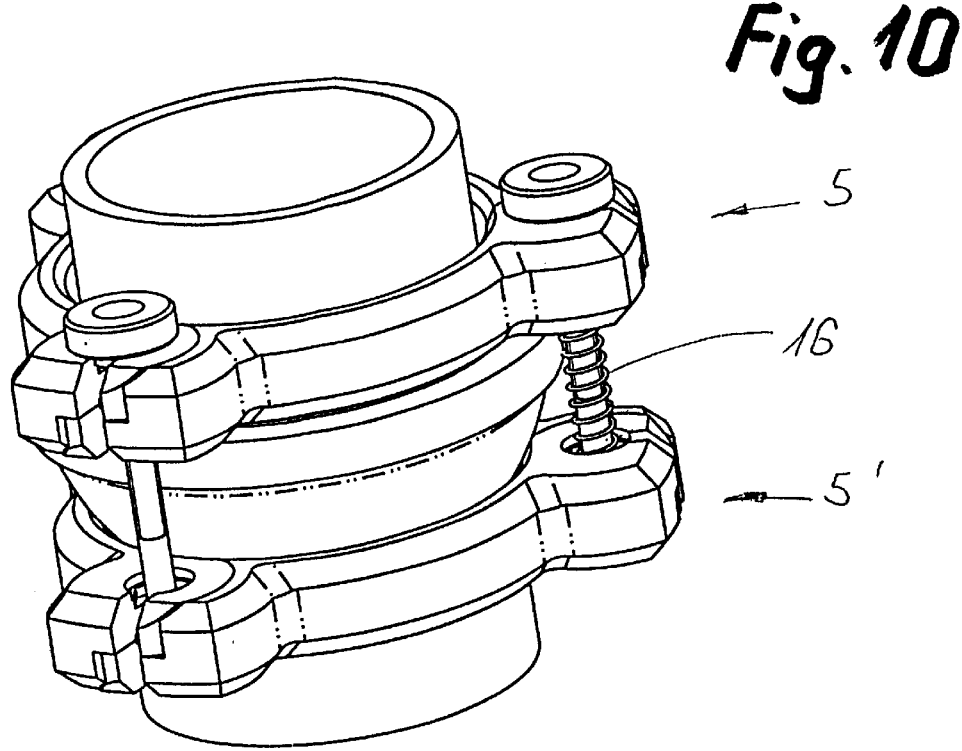
Figure 11:
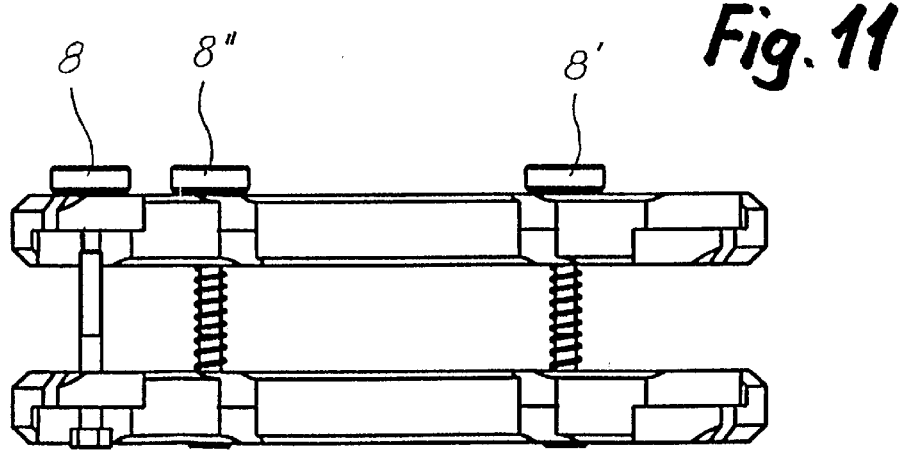
Figure 12:
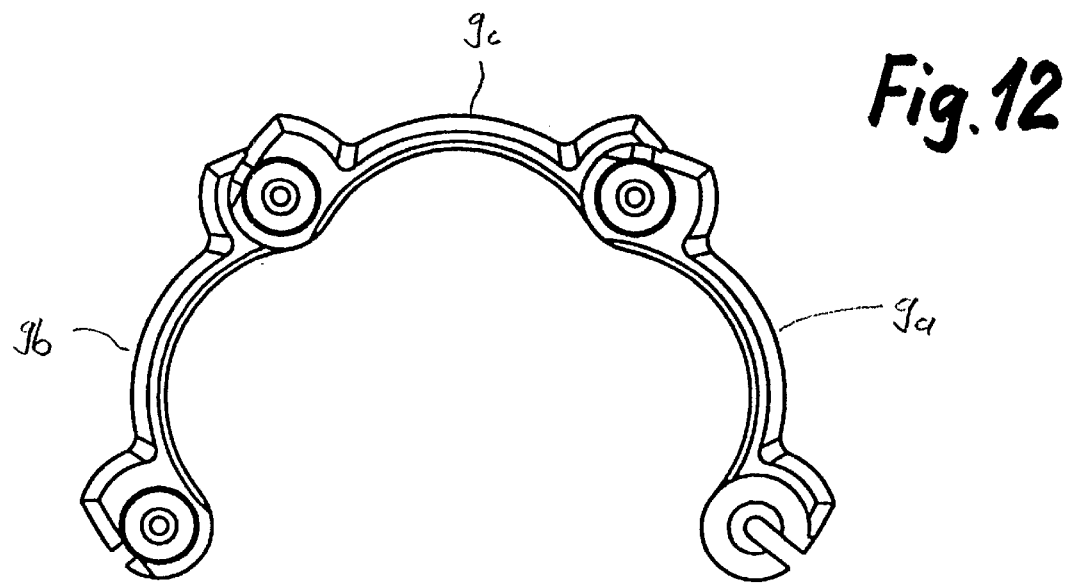
Figure 13:
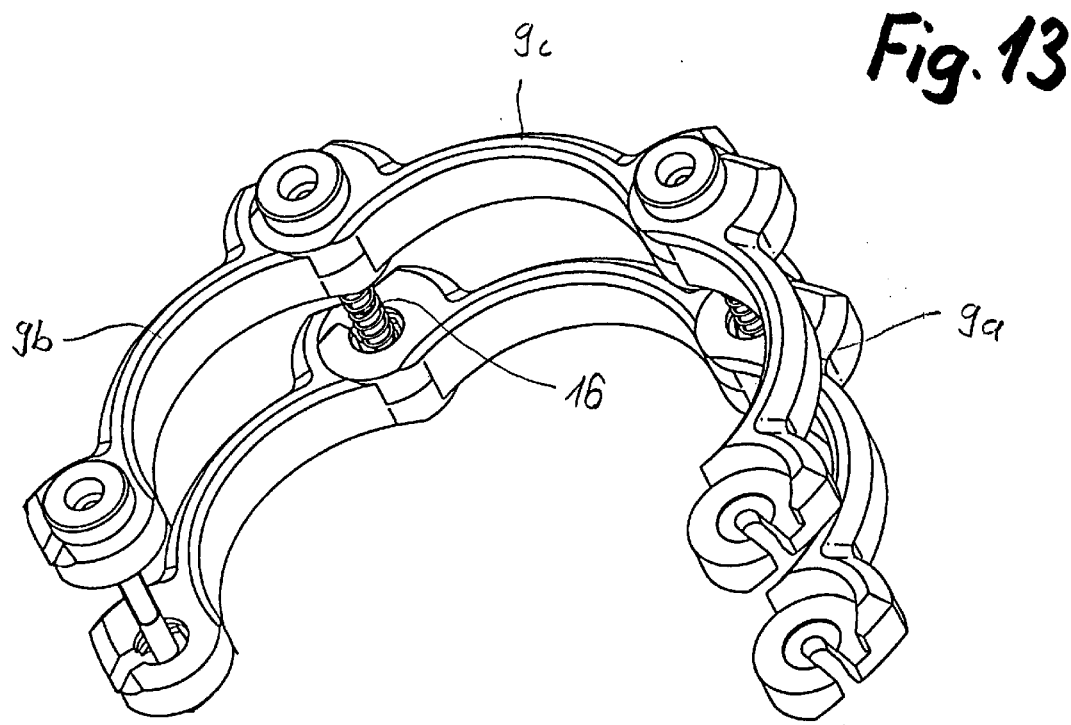
Figure 14:
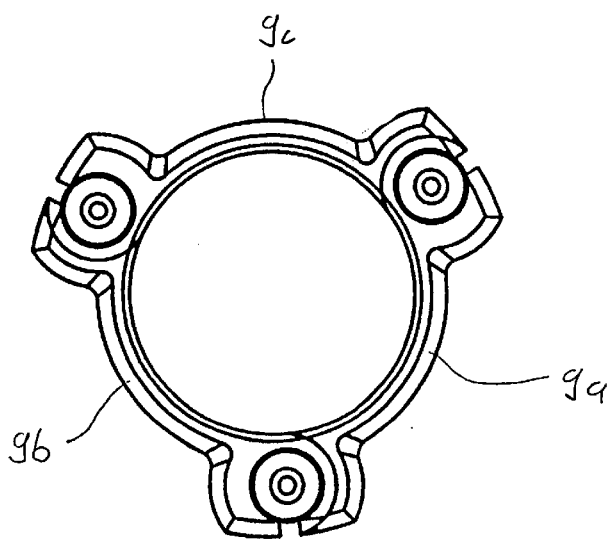
Figure 15:
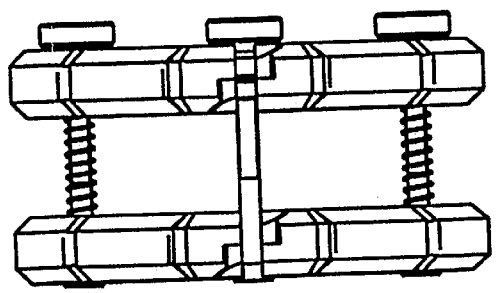
Figure 16:
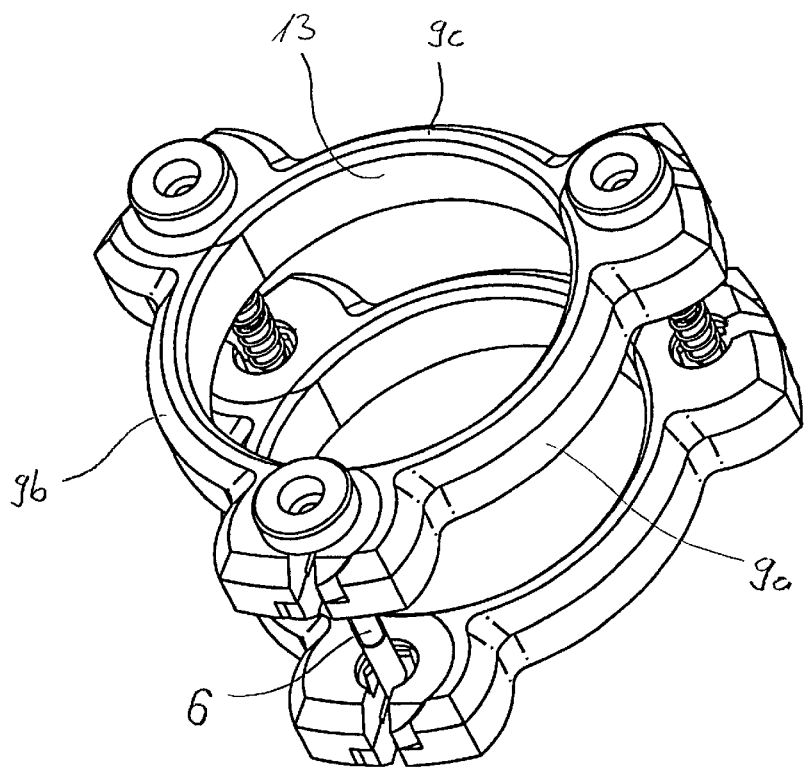
Figure 17:
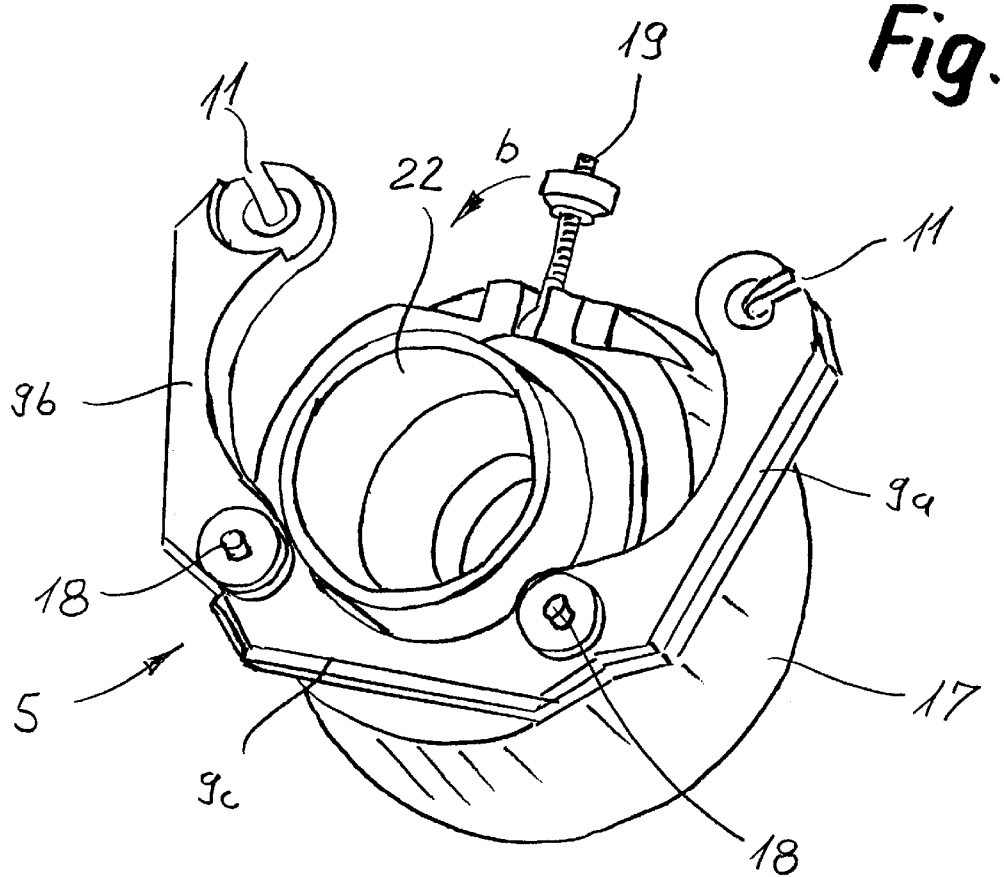

Further individual features and advantages of the invention result from the subsequent description of embodiment examples and from the drawings. There are shown:

FIG. 1 a perspective representation of a connection element each with two segments in the opened condition, FIG. 2 the connection element according to FIG. 1 in the closed condition, FIG. 3 a lateral view of the opened connection element according to FIG. 1, FIG. 4 a plan view of the connection element according to FIG. 3, FIG. 5 the connection element according to FIG. 1 from a somewhat different perspective, FIG. 6 a lateral view of the closed connection element according to FIG. 1, FIG. 7 a plan view of the connection element according to FIG. 6, FIG. 8 the closed connection element according to FIG. 2 from a somewhat different perspective, FIG. 9 a perspective representation of a connection element with three segments in the opened condition, FIG. 10 the connection element according to FIG. 9 in the closed condition, FIG. 11 a lateral view of the opened connection element according to FIG. 9, FIG. 12 a plan view of the connection element according to FIG. 11, FIG. 13 the opened connection element according to FIG. 9 from a somewhat different perspective, FIG. 14 a plan view of the closed connection element according to FIG. 10, FIG. 15 a lateral view of the connection element according to FIG. 14, FIG. 16 the closed connection element according to FIG. 10 from a somewhat different perspective, and FIG. 17 a perspective representation of a connection element with only one retaining collar with separable segments.

The FIGS. 1 and 2 show firstly a connection element 1 with two retaining collars 5, 5' consisting each of two segments 9a, 9b, and 9a', 9b' respectively, which in the FIGS. 3 to 8 is shown even more exactly without connection sections. The connection sections 2, 2' to be connected may for example be glass tubes of a laboratory installation. With this the connection section 2 is provided with a ball head 3 and the connection section 2' with a ball socket 4. The two connection sections with this form a type of ball and socket joint which permits a limited bending in all directions.

The two retaining collars 5 and 5' are formed completely identical so that subsequently in each case only one retaining collar is described. A retaining collar consists of two segments 9a, 9b of which each comprises about 180° of a connection section. The segments are provided with overlapping end sections 10a, 10b. In each end section there is arranged an opening 11 which however as a U-shaped slot extends radially up to the outer side.

The two retaining collars 5, 5' are held together with two screw bolts 6 which are introduced into the openings 11 and which comprise a screw head 7 and a nut 8. For joining the connection element the segments 9a and 9b are pivoted open so far until they may be displaced over the connection sections. Then the segments are folded together, which on account of the course of the openings 11 is only possible when the screw bolt concerned is removed. Subsequently the nuts 8 are tightened so far until the required pressure force for a sealing connection to the connection sections 2, 2' is achieved.

From FIG. 2 it can be seen that on one of the two screw bolts there is arranged a helical compression spring 16 between the two retaining collars 5, 5'. This ensures that the retaining collars are constantly tensioned apart at the correct distance. In FIG. 2 furthermore there can be seen in the region of the opening 11 a pocket hole 12 on the inner side. An identical pocket hole is however also arranged on the outer side so that the screw head 7 or a neck of the nut 8, which is not described in more detail, may be partly sunk therein. The pocket hole on the inner side serves for receiving the ends of the helical compression spring 16. With a tensioned helical compression spring or with a tightened screwing as a result evidently the screw bolts may not be pulled out laterally.

From the FIGS. 3 and 4 further details of the end sections 10a, 10b are viewable. These are practically formed as a double-sided joint bearing, wherein each end section comprises a circular-arc shaped bearing head 14a and a circular-arc shaped bearing socket 15a, wherein the circular arc of the bearing head and the bearing socket have the same diameter. On each segment the bearing head and bearing socket at the end sections are in each case formed symmetrically in opposite directions. This means that on a first plane 19 on an end section there is arranged the bearing head and on the other end section the bearing socket, and on the neighboring plane 20 it behaves reversely. On identical but laterally reversely joined together segments there evidently results with this a hermaphroditic engagement into one another of neighbouring end sections, wherein a rotary joint is formed which permits a pivoting open of the segments in the arrow direction a. The centre of the circular arc of the bearing head 14a and the bearing socket 15a corresponds to the centre of the screw bolt 6 in the closed condition. Although the U-shaped openings 11 rotate against one another on pivoting open, however the opening for the screw bolt continues to exist.

The inner wall 13 of a segment 9a or 9b is likewise formed circular-arc shaped, wherein the radius is somewhat larger than the radius of the connection section to be encompassed. In this manner the connection section with the joined and tightened connection element may still carry out a limited tilting movement.

The FIGS. 5 to 8 show further views of the described connection element. In the representation of the opened condition according to FIG. 5, both retaining collars are opened and both screw bolts are shown in their applied position. In practice however in most cases for releasing the connection only the opening of one retaining collar will be necessary. For this for example with the arrangement according to FIG. 5, or according to FIG. 8, the screw bolt 6 without the helical compression spring on the nut 8 is released to the extent that it may be laterally tilted out of, in the representation shown, the upper retaining collar. The nut 8' with this where appropriate may likewise be released, wherein the helical compression spring ensures that the two retaining collars are tensioned apart and that the screw bolt remains in its position.

In FIG. 6 the engaging into one another of the end sections 10a and 10b in the closed condition can be seen particularly clearly.

The FIGS. 9 to 13 relate to an embodiment example of a connection element with two retaining collars, however each with three segments 9a, 9b, 9c and with three screw bolts 6. The segments in each case with their inner wall 13 likewise form a circle, wherein each segment covers a section of 120°.

Of the in total three screw bolts only two are provided with a helical compression spring 16. With this as can be seen from the FIGS. 12 and 13, it is the case of those screw bolts which on opening remain in their position and form the joint bearing. For opening, the screw bolt 6 without the helical compression spring is either fully laterally pulled out, or preferably for opening a retaining collar is only tilted out on one side.

All remaining design elements are the same as with the embodiment example according to the FIGS. 1 to 8 and are therefore not again described in detail. This applies in particular also to the configuration of the end sections 10a, 10b, etc. Also with this embodiment form thus all individual segments are formed completely identically and for a joining together with a positive fit they only need to be connected to one another in a laterally reversed manner.

FIG. 17 shows an alternative embodiment example of the invention in which the connection element comprises only a single retaining collar 5 consisting of three segments 9a, 9b, 9c. In place of a second retaining collar there is provided a counter bearing element 17 which may be a direct component of a laboratory apparatus, such as e.g. of a pump, of a flask neck guide-through of a rotary evaporator, etc. The screw bolts 18 are rigidly anchored to this counter bearing element. The screw bolt 19 is jointedly mounted in the counter bearing element and may be pivoted in the arrow direction b so that it engages into the openings 11 of the two segments 9a and 9b. These segments encompass for example a tube connection piece 22 which in this manner is sealingly pressed against the counter bearing element 17. Of course also here for cleaning purposes the whole connection element may be completely disassembled.

What is claimed is:

1. A connection element for connecting neighboring connection sections on tubes or container openings on laboratory apparatus, said connection element comprising:

at least two retaining collars surrounding the connection sections, each of said retaining collars comprising at least two separable segments, at least two fastening elements engaging said retaining collars, said fastening elements releasably connecting said retaining collars and pressing said retaining collars against one another, whereby said segments in the closed condition are held together by said fastening elements in such a manner that by releasing a single fastening element at least one of said retaining collars may be opened sufficiently far that said connection sections may be separated from one another.

2. A connection element according to claim 1, wherein neighboring segments comprise mutually overlapping end sections, each having an opening for receiving a respective one of the fastening elements, the openings of overlapping end sections in the closed condition being aligned.

3. A connection element according to claim 1, wherein said fastening elements are bolts extending through the retaining collars and further comprising at least one nut for securing each of said bolts.

4. A connection element according to claim 3, further comprising a compression coil spring mounted on at least one of said bolts between the retaining collars.

5. A connection element according to claim 3, wherein said openings in the overlapping end sections extend radially outward in a continuous manner, whereby a bolt may be laterally withdrawn from an opening without completely unscrewing the respective nut.

6. A connection element according to claim 5, wherein said overlapping end sections are hinged together in such a way that, after withdrawing one of the bolts, the retaining collars may be pivoted out about the axis of at least one remaining bolt.

7. A connection element according to claim 3, wherein said overlapping sections have a pocket adjacent the opening.

8. A connection element according to claim 3, wherein the end sections of an individual segment are formed symmetrically in opposite directions in such a manner that identical but laterally reversibly joined together segments fit together with their overlapping end sections having a close fit.

9. A connection element according to claim 1, wherein said retaining collar comprises three identically formed segments held together by respective fastening elements.

10. A connection element according to claim 1, whereby said connection element comprises two identical retaining collars.

11. A connection element for connecting neighboring connection sections on tubes or container openings on laboratory apparatus, said connection element comprising a single retaining collar surrounding the connection sections, said retaining collar having at least two segments, whereby said segments are separable from one another, a counter bearing element, at least two fastening elements engaging said retaining collar and said counter bearing element, whereby said retaining collar and said counter bearing element are releasably connected and pressed against one another and whereby said segments of the retaining collar are held together in the closed condition by said fastening elements in such a manner that by releasing a single fastening element said retaining collar may be opened so far that the connection sections may be separated from one another.

* * * * *